# (12) United States Patent
Clement et al.

(10) Patent No.: US 8,097,684 B2
(45) Date of Patent: Jan. 17, 2012

(54) POLYAMIDE AND/OR POLYESTER MATRIX THERMOPLASTIC COMPOSITIONS AND ARTICLES SHAPED THEREFROM

(75) Inventors: Florence Clement, Lyons (FR); Franck Touraud, Communay (FR); Nicolangelo Peduto, Milan (IT); Christophe Lapierre, Jonage (FR); Frédéric Tronc, Saronno (IT)

(73) Assignee: Rhodia Engineering Plastics S.R.L., Cerlano Laghetto (IT)

(*) Notice: Subject to any disclaimer, the term of this patent is extended or adjusted under 35 U.S.C. 154(b) by 205 days.

(21) Appl. No.: 10/562,053

(22) PCT Filed: Jun. 22, 2004

(86) PCT No.: PCT/FR2004/001554
§ 371 (c)(1), (2), (4) Date: Aug. 8, 2006

(87) PCT Pub. No.: WO2005/000963
PCT Pub. Date: Jan. 6, 2005

(65) Prior Publication Data
US 2007/0060719 A1 Mar. 15, 2007

(30) Foreign Application Priority Data
Jun. 26, 2003 (FR) .................................. 03 07718

(51) Int. Cl.
C08G 69/14 (2006.01)
C08L 77/04 (2006.01)
C08L 77/06 (2006.01)
C08L 67/00 (2006.01)

(52) U.S. Cl. .................. 525/425; 525/432; 525/444

(58) Field of Classification Search .............. 525/425, 525/432, 444
See application file for complete search history.

(56) References Cited

U.S. PATENT DOCUMENTS

| 3,558,567 | A  | * | 1/1971  | Twilley et al. | 528/318 |
| 5,480,944 | A  | * | 1/1996  | Aharoni | 525/432 |
| 5,959,069 | A  | * | 9/1999  | Gluck et al. | 528/332 |
| 6,794,048 | B2 | * | 9/2004  | Schmitz et al. | 428/474.7 |
| 6,864,354 | B2 | * | 3/2005  | Peduto et al. | 528/480 |
| 2002/0115771 | A1 | * | 8/2002 | Schueler et al. | 524/394 |
| 2006/0211822 | A1 | * | 9/2006 | Varlet et al. | 525/165 |
| 2006/0270798 | A1 | * | 11/2006 | Touraud et al. | 525/178 |

FOREIGN PATENT DOCUMENTS

| EP | 0 957 132 A1 | 11/1999 |
| EP | 1 046 674 A2 | 10/2000 |
| EP | 1 046 674 A3 | 10/2000 |
| FR | 2 833 603 A1 | 6/2003 |
| FR | 2833603 A1 * | 6/2003 |

OTHER PUBLICATIONS

T. -T. Hsieh, C. Tiu, G. P. Simon, Melt rheology of aliphatic hyperbranched polyesters with various molecular weights, PolymerVolume 42, Issue 5, , Mar. 2001, pp. 1931-1939. (http://www.sciencedirect.com/science/article/B6TXW-41PNY7P-N/1/37237c85f58a02864520dfa301425b39) Keywords: Rheology; Hyperbranched polymer; Activation energy.*
Machine Translation of FR 2833603 A1.*
International Search Report Corresponding to PCT/FR2004/001554, Issued on Nov. 10, 2004, 2 Pages.

* cited by examiner

*Primary Examiner* — Randy Gulakowski
*Assistant Examiner* — Mike M Dollinger
(74) *Attorney, Agent, or Firm* — Buchanan Ingersoll & Rooney, P.C.

(57) ABSTRACT

Thermoplastic compositions containing a polyamide and/or polyester matrix and a variety of additives have high fluidity and can be shaped into plastic articles with good mechanical properties and an improved surface appearance.

12 Claims, No Drawings

POLYAMIDE AND/OR POLYESTER MATRIX THERMOPLASTIC COMPOSITIONS AND ARTICLES SHAPED THEREFROM

CROSS-REFERENCE TO PRIORITY APPLICATIONS

This application claims priority under 35 U.S.C. §119 of French application No. 0307718, filed Jun. 26, 2003, and is the National Phase of PCT/FR 2004/001554, filed Jun. 22, 2004 and designating the United States, published on Jan. 6, 2005 as WO 2005/000963 A1, each hereby expressly incorporated by reference and each assigned to the assignee hereof.

The present invention relates to a thermoplastic composition comprising a polyamide and/or polyester matrix and various additives. Said composition has a high fluidity, thus allowing the use of various forming techniques in the molten state, such as, for example, molding, injection molding, extrusion and drawing. The composition obtained according to the invention allows in particular the manufacture of molded plastic articles having good mechanical properties and an improved surface appearance.

Thermoplastic compositions are raw materials which can be converted by molding, injection molding, extrusion or drawing in particular to articles of multiple forms, such as plastic components, threads or fibers.

There are at least three major properties which it is desired to obtain for these thermoplastic compositions, in particular when they are used in these conversion processes.

The first of these properties consists in the fact that these thermoplastic compositions used must be characterized, in the molten state, by a fluidity or a rheological behavior compatible with the forming processes mentioned above. Indeed, these thermoplastic compositions must be sufficiently fluid when they are in the molten state in order to be able to be conveyed and handled easily and rapidly in some forming devices such as, for example, injection molding.

It is also sought to increase the mechanical properties of thermoplastic polymer compositions. These mechanical properties are in particular impact resistance, the modulus in flexure or in tension, the breaking, bending or tensile stress, among others. To this effect, reinforcing fillers, such as glass fibers, are generally used.

Finally, in the case of components molded from thermoplastic compositions, a distinct and uniform surface appearance is sought. This constraint becomes a difficult problem to solve particularly when a thermoplastic composition is used which is highly charged with glass fibers, these glass fibers negatively altering the surface appearance of the molded components. To obtain an acceptable surface appearance, it is known to use thermoplastic compositions having high fluidity. However, this increase in fluidity results in a reduction in the mechanical properties in the articles obtained.

The result is thus that it is difficult to obtain these different properties for the same thermoplastic composition.

The present invention relates to thermoplastic compositions obtained by mixing a thermoplastic matrix with at least one mono- or multifunctional acid or amine compound and additives, in particular additives of the functionalized branched polyamide type.

The thermoplastic composition according to the invention has a high fluidity in the molten state. This composition is thus suited to the various forming techniques in the molten state, such as, for example, molding, injection molding, extrusion and drawing. This thermoplastic composition has the rheological qualities, in the molten state, and the mechanical qualities required in industry for the conversion of these polymers, without the additivation required for improving these properties disrupting the other properties of the polymer.

Indeed, the compositions according to the invention allow the manufacture of articles having good mechanical properties. Moreover, the molded articles obtained from these compositions according to the invention also have an improved surface appearance.

Furthermore, the molded articles obtained from the compositions according to the invention have good stability of the mechanical properties following thermal aging.

The present invention relates to a thermoplastic composition obtained by mixing a polyamide and/or polyester matrix with at least:
(i) a first additive of formula R—$Z_u$, in which:
   R represents a hydrocarbon radical which may comprise one or more heteroatoms,
   u is an integer greater than or equal to 1, preferably between 1 and 50, more preferably between 2 and 10, particularly between 2 and 5;
   Z is an acid, amine or alcohol functional group, and
(ii) a second additive chosen from the group consisting of:
   (A) an additive obtained by the reaction between at least:
      a) one multifunctional compound of formula (I):

$$R^1—X_n \quad (I)$$

b) one multifunctional compound of formula (III):

$$R^3—Y \quad (III); \text{ and}$$

c) optionally one bifunctional monomer of formula (II) or the corresponding cyclic form:

$$X—R^2—Y \quad (II); \text{ and}$$

(B) one additive obtained by the reaction between at least:
      a) one monofunctional compound of formula (III):

$$R^3—Y \quad (III)$$

b) one branching compound of formula (IV):

$$Y—R^4—X_m \quad (IV)$$

c) optionally one multifunctional compound of formula (I):

$$R^1—X_n \quad (I); \text{ and}$$

d) optionally one bifunctional monomer of formula (II) or the corresponding cyclic form:

$$X—R^2—Y \quad (II)$$

in which:
   $R^1$, $R^2$, $R^3$ and/or $R^4$ represent, independently of each other, a hydrocarbon radical optionally comprising one or more heteroatoms;
   X and Y are antagonist reactive functional groups capable of reacting with each other to form an acid bond;
   n is an integer between 3 and 50, preferably between 3 and 10;
   m is an integer between 2 and 10; and
   R, $R^1$, $R^2$, $R^3$ and $R^4$ do not comprise an amine, acid or alcohol functional group capable of forming an amide and/or ester bond.

The composition according to the invention may comprise one or more types of additive (i) and (ii).

The composition according to the invention may be a mixture of the various compounds, for example in granulated, powdered and/or liquid form. The composition may also result from a mixing, in the molten state, of the various additives with the polyamide and/or polyester matrix.

The composition may comprise from 0.01 to 5% by weight of the first additive (i) relative to the total weight of the composition, preferably from 0.1 to 2%, more preferably from 0.2 to 1%.

The composition according to the invention may comprise from 0.01 to 20% by weight of the second additive (ii) relative to the total weight of the composition, preferably from 0.3 to 10%, more preferably from 0.5 to 5%.

The first additive (i) has acid, amine or alcohol endings and can react, partially or completely, with the polyamide or polyester matrix. The first additive (i) as such, that is to say not covalently linked to the polyamide and/or polyester matrix, may also be present in the thermoplastic composition.

Preferably, R represents a linear or branched, saturated or unsaturated, aliphatic, cyclic and/or aromatic hydrocarbon radical which may optionally comprise one or more heteroatoms, the radical R more preferably comprising from 2 to 100, more preferably still from 5 to 20 carbon atoms. It may comprise one or more heteroatoms chosen from the group comprising: nitrogen, phosphorus, fluorine, oxygen, silicon and sulfur.

The radical R does not comprise an amine, acid or alcohol functional group capable of forming an amide and/or ester bond. As example of functional group not forming an amide and/or ester bond, there may be mentioned sulfonate, phosphonate, halogen and tertiary amine functional groups.

By way of example of additive (i), there may be mentioned 2,2,6,6-tetra(β-carboxyethyl)cyclohexanone, diaminopropane-N,N,N'N'-tetraacetic acid of the following formula:

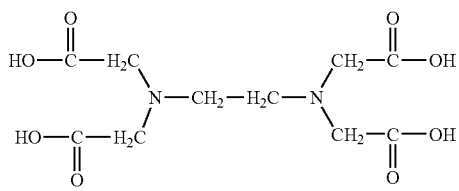

or the compounds derived from the reaction of trimethylolpropane or glycerol with propylene oxide and amination of the terminal hydroxyl groups. The latter compounds are marketed under the trade name Jeffamine T® by the company Huntsman, and have as general formula:

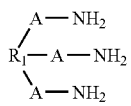

in which:
R₁ represents a 1,1,1-triylpropane or 1,2,3-triylpropane radical,
A represents a polyoxyethylene radical.

It is possible to use for example Jeffamine T403® (polyoxypropylenetriamine) from Huntsman as multifunctional compound according to the invention.

Examples of multifunctional compounds which may be suitable are mentioned in particular in the documents U.S. Pat. No. 5,346,984, U.S. Pat. No. 5,959,069, WO 9635739 and EP 672703.

There may be mentioned more particularly: nitrilotrialkylamines, in particular nitrilotriethylamine, dialkylenetriamines, in particular diethylenetriamine, trialkylenetetraamines and tetraalkylenepentaamines, alkylene being preferably ethylene, 4-aminoethyl-1,8-octanediamine.

There may also be mentioned the multifunctional compounds having 3 to 10 carboxylic acid groups, preferably 3 or 4. Among these, compounds having an aromatic and/or heterocyclic ring, for example benzyl, naphthyl, anthracenyl, biphenyl and triphenyl radicals, or heterocycles such as pyridine, bipyridine, pyrrole, indole, furan, thiophene, purine, quinoline, phenanthrene, porphyrin, phthalocyanine and naphthalocyanine are preferred.

3,5,3',5'-Biphenyltetracarboxylic acid, the acids derived from phthalocyanine and naphthalocyanine, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, more particularly still trimesic acid and 1,2,4,5-benzenetetracarboxylic acid, are most particularly preferred.

There may also be mentioned the multifunctional compounds in which the core is a heterocycle having a point of symmetry, such as 1,3,5-triazines, 1,4-diazines, melamine, compounds derived from 2,3,5,6-tetraethylpiperazine, 1,4-piperazines, tetrathiafulvalenes. There may be mentioned more particularly 2,4,6-tri(aminocaproic acid)-1,3,5-triazine (TACT).

It is also possible to use additives (i) containing one or more alcohol functional groups. There may be mentioned, for example, glycol, trimethylolpropane, glycerol, pentaerythritol, sorbitol, mannitol, various monosaccharides, such as sucrose, polysaccharides, and/or mixtures thereof.

The first additive (i) according to the invention is preferably chosen from the group comprising: isophthalic acid, terephthalic acid, adipic acid, trimesic acid, 2,2,6,6-tetrakis(β-carboxyethyl)cyclohexanone, diaminopropane-N,N,N', N'-tetraacetic acid, nitrilotrialkylamines, trialkylenetetraamines, tetraalkylenepentaamines, 4-aminoethyl-1,8-octanediamine, 3,5,3',5'-biphenyltetracarboxylic acid, acid derivatives of phthalocyanine and naphthalocyanine, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, 1,2,4,5-benzenetetracarboxylic acid, 1,3,5-triazines, 1,4-diazines, melamine, compounds derived from 2,3,5,6-tetraethylpiperazine, 1,4-piperazines, tetrathiafulvalenes, 2,4,6-tri(aminocaproic acid)-1,3,5-triazine (TACT), dodecylamine, octadecylamine, piperidine, benzylamine, aniline, hexanoic acid, palmitic acid, stearic acid, oleic acid, benzoic acid, hehenic acid, oleic acid, polyalkylene oxides comprising at least one amine or acid functional group, glycol, trimethylolpropane, glycerol, pentaerythritol, sorbitol, mannitol, monosaccharides, and/or mixtures thereof.

The second additive (ii) is an additive obtained by the reaction between various compounds and monomers comprising the radicals R¹, R², R³ and/or R⁴, as mentioned above.

The radicals R¹, R², R³ and/or R⁴ of the second additive (ii) represent, independently of each other, a linear or branched, saturated or unsaturated, aliphatic, cyclic and/or aromatic hydrocarbon radical which may optionally comprise one or more heteroatoms. These radicals preferably comprise from 2 to 100, more preferably from 5 to 30 carbon atoms. It may comprise one or more heteroatoms chosen from the group comprising: nitrogen, phosphorus, fluorine, oxygen, silicon and sulfur.

As mentioned above, the radicals R¹, R², R³ and/or R⁴ do not comprise an amine, acid and/or alcohol functional group capable of forming an amide and/or ester bond. As example of functional group not forming an amide and/or ester bond, there may be mentioned the sulfonate, phosphonate, halogen and tertiary amine functional groups.

Only the functional groups X and Y of the various compounds and monomers forming the additive (ii) are antagonist reactive functional groups capable of reacting with each other to form an amide bond. For example, Y is an amine functional group when X represents an acid functional group, or Y is an acid functional group when X represents an amine functional group. The expression acid functional group is understood to mean, for the purpose of the invention, any carboxylic acid functional group or a derivative thereof, in particular of the ester or anhydride type.

Depending on the proportion of monofunctional compound of formula (III) used, relative to the other compounds and monomers forming the second additive (ii), the acid and/or amine endings of said additive (ii) are, completely or in part, linked to groups $R^3$ not comprising an acid or amine functional group capable of forming a covalent amide bond. Preferably, at least 50% in numerical terms of endings of the second additive (ii) comprise groups $R^3$ which are identical or different.

Preferably, the content of acid and amine terminal groups of the additive (ii) is between 0 and 300 meq/kg. More preferably this content is between 0 and 150 meq/kg, particularly between 0 and 100 meq/kg, most particularly between 0 and 50 meq/kg. The content of acid and/or amine terminal groups may be assayed by potentiometry.

The molecular mass of the second additive (ii) (A) may be between 500 and 20,000 g/mol. Preferably, the molecular mass of the additive (ii) (A) is between 1000 and 10,000 g/mol, particularly between 1000 and 5000 g/mol. The molecular mass of the second additive (ii) (B) may be between 500 and 50,000 g/mol. Preferably, the molecular mass of the additive (ii) (B) is between 1000 and 30,000 g/mol, particularly between 3000 and 15,000 g/mol. As mentioned above, the additives (ii) (A) and/or (B) may be obtained by the reaction between the compounds comprising bifunctional monomers (II) of formula $X—R^2—Y$ or their corresponding cyclic form.

In this case, the additives (ii) (A) and/or (B) are polyamides. They are branched polyamides insofar as they comprise motifs derived from multifunctional compounds (I) and/or branching compounds (IV). These branched polyamides are functionalized because they comprise monofunctional compounds of formula $R^3—Y$.

The additive (ii) (A) is preferably a functionalized star-shaped polyamide obtained by the reaction of at least: one multifunctional compound of formula (I), one bifunctional monomer of formula (II) or the corresponding cyclic form, and one monofunctional compound of formula (III).

The additive (ii) (B) is preferably a functionalized hyperbranched polyamide obtained by the reaction of at least: optionally one multifunctional compound of formula (I), one bifunctional monomer of formula (II) or the corresponding cyclic form, one monofunctional compound of formula (III), and one branching compound of formula (IV).

The multifunctional compound of formula (I) may correspond to the additive (i) of formula $R—Z_u$, as defined above.

Thus, the multifunctional compound of formula (I) is preferably chosen from the group comprising: 2,2,6,6-tetrakis(β-carboxyethyl)cyclohexanone, diaminopropane-N,N,N',N'-tetraacetic acid, nitrilotrialkylamines, trialkylenetetraamines and tetraalkylenepentaamines, 4-aminoethyl-1,8-octanediamine, 3,5,3',5'-biphenyltetracarboxylic acid, the acid derivatives of phthalocyanine and naphthalocyanine, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, trimesic acid, 1,2,4,5-benzenetetracarboxylic acid, 1,3,5-triazines, 1,4-diazines, melamine, the compounds derived from 2,3,5,6-tetraethylpiperazine, 1,4-piperazines, tetrathiafulvalenes, 2,4,6-tri(aminocaproic acid)-1,3,5-triazine (TACT), polyalkylene oxides containing at least three acid or amine functional groups, and/or mixtures thereof.

The bifunctional monomer of formula (II) is preferably chosen from the group comprising: ε-caprolactam and/or the corresponding amino acid: aminocaproic acid, para- or meta-aminobenzoic acid, 11-aminoundecanoic acid, lauryllactam and/or the corresponding amino acid, 12-aminododecanoic acid, caprolactone, 6-hydroxyhexanoic acid, oligomers thereof and mixtures thereof. These oligomers may possess a degree of polymerization of between 2 and 15.

The monofunctional compound of general formula (III) may be chosen from the group comprising: an aliphatic monoacid or monoamine compound, an aromatic monoamine or monoacid compound, an organophosphorus monoamine or monocarboxylic acid compound, an organosulfo monoamine or monocarboxylic acid compound, a quaternary ammonium monoamine or monocarboxylic acid compound and/or mixtures thereof. Preferably, the monofunctional compound of general formula (III) is an aliphatic linear chain of the alkyl type comprising an amine functional group or an acid functional group. More preferably, the monofunctional compound of general formula (III) is chosen from the group comprising: n-hexadecylamine, n-octadecylamine, n-dodecylamine, benzylamine, aminomethylphosphonic acid, sulfanilic acid, sulfobenzoic acid, betaine, and/or mixtures thereof.

Preferably, the branching compound of formula (IV) is chosen from the group comprising: 5-aminoisophthalic acid, 6-aminoundecandioic acid, 3-aminopimelic diacid, aspartic acid, 3,5-diaminobenzoic acid, 3,4-diaminobenzoic acid, lysine and/or mixtures thereof. Various ways exist for synthesizing the additives (ii) according to the invention. It is possible, for example, to bring the various compounds into contact with the additives (ii) and to carry out a polycondensation. It is also possible to add the various compounds in a single step or in several steps during the polycondensation.

According the present invention, it is possible to mix, during the reaction, one or more compounds of formula (I), (II), (III) and/or (IV) of different types.

The additive (ii) (A) may be obtained by the reaction between a multifunctional compound of formula (I) in proportions of between 1 and 30% by weight, a monofunctional compound of formula (III) in proportions of between 5 and 60% by weight, and optionally a bifunctional monomer of formula (II) in proportions of between 0 and 95% by weight. Preferably, the additive (A) is obtained by the reaction between a multifunctional compound of formula (I) in proportions of between 2 and 20% by weight, a bifunctional monomer of formula (II) in proportions of between 30 and 90% by weight, and a monofunctional compound of formula (III) in proportions of between 10 and 50% by weight.

The additive (B) may be obtained by the reaction between a monofunctional compound of formula (III) in proportions of between 20 and 70% by weight, a branching compound of formula (IV) in proportions of between 10 and 50% by weight, optionally a multifunctional compound of formula (I) in proportions of between 0 and 10% by weight and optionally a bifunctional monomer of formula (II) in proportions of between 0 and 50% by weight. Preferably, the additive (B) may be obtained by the reaction between a monofunctional compound of formula (III) in proportions of between 30 and 60% by weight, a branching compound of formula (IV) in proportions of between 20 and 40% by weight, a multifunctional compound of formula (I) in proportions of between 1 and 5% by weight and a bifunctional monomer of formula (II) in proportions of between 10 and 30% by weight.

It is clearly understood that the sum, in percentages, of the various compounds must be equal to 100%.

Preferably, the addition of additives (ii) mixed with the polymeric matrix causes a decrease in the molar mass less than 15% of said matrix, relative to the same matrix containing no additives (ii); the measurement of the molar mass being read out according to a determined protocol P. The details of the protocol P for measuring the molar mass are given below.

In accordance with the invention, the additive (ii) therefore advantageously has, as a characteristic, a capacity to modify the rheological behavior of the polymer matrix, without adversely affecting its structural integrity, and in particular without substantially reducing its molar mass.

According to the present invention, the molar mass is defined as the distribution maximum of the molar masses of the polymer matrix supplemented with the branched polyamide, as Polystyrene equivalent, by gel permeation chromatography (GPC), with detection by refractometry, as is defined in the protocol P given in detail below.

The measurement of the molar mass is carried out on the composition to be analyzed and on the control composition (containing no additive (ii)), extruded, solidified and then optionally converted to granules.

The abovementioned protocol P for measuring the molar mass of the polymeric matrix, in a composition to be analyzed and in a control composition, involves extrusion, which leads to the production of rods, which are then cut into granules. The determination of the molar mass itself may be carried out, for example, on the granules or on a molded final component.

1/Polyamide Matrix/Additive (ii) Compositions

The polyamide matrix and the additive (ii) are provided in a form that is ground or crushed to a powder, flakes or granules, and are then premixed.

The mixture is melted in a twin-screw extruder, LEISTRITZ model (screw diameter 30 mm-L/D ratio:4), under the following conditions: throughput: 10 kg/h; screw speed: 250 rpm, temperature profile: 250-280° C. for a polyamide 66, 220-250° C. for a polyamide 6. Rods are recovered at the outlet of the extruder which are then converted to granules.

The measurement of the molar mass itself is carried out on the granules by gel permeation chromatography (GPC) in dichloromethane after derivatization of the polyamide with trifluoroacetic anhydride, relative to polystyrene standards.

The detection technique used is refractometry (model RI ERMA refractometer, sensitivity 16).

The GPC columns have the following characteristics: 3 mixed-C columns, 5 µm, diameter ⅜, length 60 cm+precolumn 5 µm.

2/Control Compositions Based on Polyamide Matrix with no Additive (ii)

For each given polyamide matrix/additive (ii) composition, a measurement of molar mass of the same polyamide matrix is performed on a composition comprising the polyamide matrix with no additive (ii).

The method is carried out on polyamide granules obtained in the same manner as that indicated at point 1 above, the only difference being that the granules contain no additive (ii).

The polyamide matrix is generally composed of a (co)polyamide chosen from the group comprising: polyamide 6, polyamide 6,6, polyamide 4, polyamide 11, polyamide 12, polyamides 4-6, 6-10, 6-12, 6-36, 12-12, and copolymers and mixtures thereof.

There may be mentioned, for example, the semicrystalline or amorphous polyamides such as the aliphatic polyamides, semiaromatic polyamides and more generally the linear polyamides obtained by polycondensation between a saturated aliphatic or aromatic diacid, and a saturated aromatic or aliphatic primary diamine, the polyamides obtained by condensation of a lactam, of an amino acid or the linear polyamides obtained by polycondensation of a mixture of these various monomers. More precisely, these copolyamides may be, for example, polyhexamethylene adipamide, polyphthalamides obtained from terephthalic and/or isophthalic acid, the copolyamides obtained from adipic acid, hexamethylene diamine and caprolactam.

According to an advantageous characteristic of the invention, the polyamide matrix of the composition consists of a mixture and/or alloy of a polyamide with one or more other polymers, preferably polyamides or copolyamides. A mixture and/or alloy of (co)polyamides with at least one polymer of the polypropylene oxide (PPO), polyvinyl chloride (PVC) or polyacrylobutadienestyrene (ABS) type may also be envisaged.

The polyester matrix is generally composed of at least one polyester chosen from the group comprising: polyethylene terephthalate (PET), polybutylene terephthalate (PBT), polypropylene terephthalate (PPT).

Most preferably, the composition according to the invention may be obtained by mixing at least:

a polyamide matrix, optionally in the molten state;

a first additive (i) chosen from the group comprising: trimesic acid, isophthalic acid, terephthalic acid, adipic acid and 2,2,6,6-tetrakis(β-carboxyethyl)cyclohexanone; and a second additive (ii) of the hyperbranched polyamide type comprising alkyl functional endings.

Starting with the thermoplastic composition obtained according to the present invention, various method exist which make it possible to determine the matrix and the types of additive used.

It is possible, for example, to identify the matrix of the thermoplastic composition by performing an infrared (IR) spectrometry.

It is also possible to identify the types of monomer and compound used for the manufacture of the additives, and to measure their proportions. For example, it is possible to hydrolyze the thermoplastic composition of the invention, and to analyze the hydrolysate by liquid chromatography (HPLC) or gas chromatography (GC), optionally coupled to a mass spectrometer, so as to determine and measure the proportions of the constituent monomers and compounds of the additives used and of the polyamide and/or polyester matrix. It is possible, for example, to carry out an acid hydrolysis of the composition of the invention using 5N hydrochloric acid.

It is also possible to measure the content of acid and amine terminal groups by potentiometric assay of the composition of the invention.

It is also possible to solubilize the composition obtained and to measure, by nuclear magnetic resonance (NMR) and/or UV and/or IR spectrometry techniques, the types of additive used and their proportions. The solubilization of the composition may be carried out using an appropriate solvent, such as hexafluoroiso-propanol (HSIP) or formic acid.

It is also possible to extract the various additives from the composition according to the invention with an appropriate solvent. These may be assayed by liquid chromatography (HPLC) or gas chromatography (GC).

To improve the mechanical properties of the composition according to the invention, it may be advantageous to add reinforcing and/or bulk fillers to it, chosen from the group comprising fibrous fillers such as glass fibers, inorganic fillers such as clays, kaolin, or reinforcing nanoparticles or those made of heat-curable material, and powdered fillers such as talc. The level of incorporation of these fillers is in accordance with the standards in the field of composite materials. It may be for example a filler level of 1 to 70% by weight, preferably 10 to 60% by weight, more specifically 30 to 50% by weight, relative to the total weight of the composition.

It is also possible to add impact resistance modifying agents such as optionally graft elastomers.

The composition according to the invention may also contain any other appropriate additives or adjuvants, for example flame retardants, UV stabilizers, heat stabilizers, mattifying agents ($TiO_2$) lubricants, plasticizers, compounds useful for catalyzing the synthesis of the polymer matrix, antioxidants, antistatic agents, pigments, colorants, molding additives or surfactants.

The present invention also relates to a process for the manufacture of a composition as described above, obtained by mixing at least the first additive (i) and the second additive (ii) with the polyamide and/or polyester matrix.

Various methods exist for manufacturing the composition as described above.

It is for example possible to mix the polyamide and/or polyester matrix in the solid state, for example in the form of granules, with the additives (i) and (ii) so as to obtain a solid composition. This composition may be introduced into an extrusion device so as to be melted.

It is also possible to produce this mixture in the molten state. It is thus possible to mix the additives (i) and (ii), simultaneously or spaced out over time, in the molten matrix, and optionally subject the mixture to shearing, for example in a twin-screw extrusion device so as to perform a good dispersion.

It is also possible to mix the polyamide and/or polyester matrix, a concentrated mixture of additive (i) and/or of additive (ii) in a polyamide and/or polyester matrix, prepared for example according to the method described above.

The extrusion device is generally placed upstream of the device for forming the molten plastic material, such as for example appropriate molding, extrusion, injection or drawing devices. It is also possible to extrude this mixture in the form of rods which are then cut into granules. The molded components are then prepared by melting the granules produced above and feeding the composition in the molten state into appropriate molding, extrusion, injection or drawing devices.

In the case of the manufacture of threads, fibers and filaments, the composition obtained at the outlet of the extruder optionally directly feeds a drawing installation.

The present invention also relates to a process for the manufacture of an article by forming the composition according to the invention by a process chosen from the group comprising an extrusion device, a molding device such as compression molding, an injection device, such as injection molding, and a drawing device.

The invention also relates to the articles obtained by forming the composition of the invention, by any thermoplastic conversion techniques, such as those mentioned above.

Preferably, the articles of the invention are articles obtained by a device chosen from the group comprising an extrusion device, a molding device such as compression molding, and an injection device, such as injection molding.

The articles of the invention may be, for example, any type of components obtained by injection molding in which good mechanical properties and an appropriate surface appearance are required, such as boxes, handles, plastic components for household items, vehicle components such as for example, components for a car cooling circuit, covering or coating components.

Other details and advantages of the invention are mentioned in the examples which follow.

Materials used:

PA66: viscosity index, measured at 25° C. in 90% formic acid, of 137 ml/g (ISO 307). Content of terminal amine groups of 53 meq/kg and content of terminal acid groups of 72 meq/kg (assay by potentiometry).

glass fiber (GF): diameter 10 μm; length 4.5 mm (Vetrotex® 983)

isophthalic acid (T2)

trimesic acid (T3)

2,2,6,6-tetrakis(β-carboxyethyl)cyclohexanone (T4)

calcium stearate carbon black (Plasblack® 4161 from Ferroplast)

EXAMPLE 1

Synthesis of a Functionalized Hyperbranched Copolyamide

The HBPA is synthesized by copolycondensation, in the molten state of 1,3,5-benzenetricarboxylic acid (trimesic acid, noted BTC, core molecule of the $R^1$—$X_3$ type, with X=COOH), 5-aminoisophthalic acid (noted AIPA, branching molecule of the Y—R'—$X_2$ type, with Y=$NH_2$), ε-caprolactam (noted CL, spacer of the X—$R^2$—Y type) and n-hexadecylamine (noted $C_{16}$, alkyl blocker of the $R^3$—Y type). The respective overall composition is 1/6/6/9 in BTC/AIPA/CL/$C_{16}$.

The monomers are completely charged at the beginning of the assay into the reactor preheated to 70° C. There are successively introduced into the reactor 49.8 kg of molten hexadecylamine at 90% purity (0.19 mol), 14.0 kg of ε-caprolactam (0.12 mol), 22.4 kg of 5-aminoisophthalic acid (0.12 mol), 4.3 kg of 1,3,5-benzenetricarboxylic acid (0.02 mol) and 163 g of a 50% aqueous solution (w/w) of hypophosphorous acid. The reactor is purged with dry nitrogen.

The reaction mass is heated from 70° C. to 260° C. in about 200 min.

About 6 kg of distillate are recovered.

At the end of the cycle, a Sandwick pelletizer is connected at the outlet of the reactor.

Characterization of the Hyperbranched Copolyamide of Example 1

The contents of terminal acid and amine groups are assayed by potentiometry. The molar masses are determined by gel permeation chromatography (GPC) in dimethylacetamide, relative to polystyrene standards, and then by detection by refractometry RI. The results are assembled in the table below.

TABLE 1

| Compound | Theoretical Mn | GTA | GTC | Mn | Mw | VP |
|---|---|---|---|---|---|---|
| HBPA Ex. 1 | 3879 | 3.3 | 12.3 | 6340 | 11380 | 1.79 |

The following abbreviations are used:
GTA: content of terminal amine groups (meq/kg)
GTC: content of terminal acid groups (meq/kg)
Mn, Mw: Mean molar masses (number average and weight average respectively), as polystyrene equivalent (g/mol)
VP: polydispersity value (Mw/Mn)

DSC analyses of this hyperbranched copolyamide show only one broad melting peak at around −4° C. corresponding to the alkyl segments.

EXAMPLE 2

Preparation of Compositions with Glass Fibers

Compositions are prepared from polyamide PA 66, glass fibers, acids T2, T3 and/or T4 (corresponding to the additive (i)) and a hyperbranched copolyamide of Example 1 (corresponding to additive (ii)) at various levels of incorporation.

These compositions are prepared by mixing polyamide 66 granules, additives (i) and (ii) and carbon black and calcium stearate in a twin-screw extruder WERNER ZSK 40 model (screw diameter 40 mm-L/D ratio: 3.2), under the following conditions: throughput: 40 kg/h; screw speed: 260 rpm, temperature profile (° C.) 250-280° C. The compositions and their properties are presented in Table 2 below.

TABLE 2

| Compositions and properties | C1 | C2 | C3 | C4 | C5 | C6 | 7 | 8 |
|---|---|---|---|---|---|---|---|---|
| PA 66 | 48.7 | 48.5 | 48.2 | 48.0 | 47.7 | 43.7 | 47.0 | 47.2 |
| GF | 50 | 50 | 50 | 50 | 50 | 50 | 50 | 50 |
| T2 |  | 0.2 |  | 0.2 |  |  | 0.2 |  |
| T4 |  |  | 0.5 | 0.5 |  |  | 0.5 |  |
| T3 |  |  |  |  |  |  |  | 0.5 |
| HBPA ex. 1 |  |  |  |  | 1.0 | 5.0 | 1.0 | 1.0 |
| Impact resistance smooth at 23° C. (kJ/m$^2$) ISO 179-1eU | 90.8 | 73.6 | 80 | 78 | 82 | 88 | 88 | 93.4 |
| Impact resistance notched at 23° C. (kJ/m$^2$) ISO 179-1eA | 13.6 | 9.6 | 10.5 | 10.0 | 12 | 13.4 | 13.0 | 12.2 |
| Spiral length (mm)* | 290 | 360 | 300 | 350 | 340 | 500 | 470 | 410 |
| Modulus Tension at 23° C. (N/mm$^2$) ISO 527 | 16 100 | 16 700 | 16 100 | 16 100 | 16 400 | 16 400 | 16 400 | 16800 |
| Surface appearance ** | 0 | + | 0 | + | − | −− | + | ++ |

All the compositions comprise 1% by weight of carbon black and 0.3% by weight of calcium stearate. The percentages are expressed by weight relative to the total weight of composition.

*Spiral Test for Quantification of the Fluidity of the Compositions:

The granules of the composition comprising polyamide 66+50% glass fibers+/−additive (i)+/−additive (ii) are melted and then injected into a mold in spiral form with a semicircular section having a thickness of 2 mm and a diameter of 4 mm, with a DEMAG H200-80 press at a barrel temperature of 300° C., a mold temperature of 80° C. and with an injection pressure of 1500 bar. The duration of injection is 0.5 second. The result is expressed in length of mold correctly filled with the composition (spiral length). The compositions evaluated in this test all have an equivalent moisture level before molding to within 0.1% relative to the matrix.

**Test of Surface Appearance of the Compositions Loaded with Glass Fibers:

The granules of the composition containing PA 66+50% glass fibers+/−additive (i)+/−additive (ii) are melted and then injected into a plate mold 100*100*1.6 mm thick, with a DEMAG H200-80 press at a barrel temperature of 300° C. and a mold temperature of 80° C. The components are injected in the form of a sheet over the entire surface area of the plate and the thickness of the injection threshold is equal to ⅔ of the thickness of the component.

The components are classified relative to the surface appearance obtained on a control composition (standard commercial formulation containing PA 66+50% glass fibers):

0 means that the surface appearance obtained is similar to that of the control;

+ means that the surface appearance obtained is better than that of the control;

++ means that the surface appearance obtained is markedly better than that of the control;

− means that the surface appearance obtained is inferior compared to that of the control; and −− means that the surface appearance obtained is markedly inferior to that of the control.

The compositions evaluated in this test all have an equivalent moisture level before molding to within 0.1% relative to the control composition.

EXAMPLE 4

Preparation of Compositions without Glass Fibers

Compositions (Table 3), containing no glass fibers, based on polyamide 66 additivated with variable quantities of additive (i) and (ii) are prepared by mixing in the molten state in a twin-screw extruder, LEISTRITZ model (screw diameter 30 mm-L/D ratio 4), under the following conditions: throughput: 10 kg/h; screw speed: 250 revolutions/min; temperature profile (° C.) 250-280° C.

TABLE 3

| Compositions and properties | C7 | C8 | C9 | C10 | 11 | 12 |
|---|---|---|---|---|---|---|
| PA 66 | 100.0 | 99.6 | 98.6 | 98.0 | 97.6 | 96.6 |
| T2 | | 0.4 | 0.4 | | 0.4 | 0.4 |
| T4 | | | 1.0 | | | 1.0 |
| HBPA ex. 1 | | | | 2.0 | 2.0 | 2.0 |
| Impact resistance smooth at 23° C. (kJ/m$^2$) ISO 179-1eU | NR* | NR | NR | NR | NR | NR |
| Impact resistance notched at 23° C. (kJ/m$^2$) ISO 179-1eA | 4.5 | 4.6 | 4.4 | 7.3 | 6.0 | 5.9 |
| Spiral length (mm) internal method* | 520 | 700 | 850 | 440 | 740 | 860 |

*NR: No rupture of the sample during the smooth impact resistance test. All the compositions comprise 1% by weight of carbon black and 0.3% by weight of calcium stearate. The percentages are expressed by weight relative to the total weight of the composition.

EXAMPLE 5

Preparation of Nonfunctionalized HBPA

Synthesis of a hyperbranched copolyamide with carboxylic acid endings by copolycondensation in the molten phase of 1,3,5-benzenetricarboxylic acid (noted BTC, core molecule of the $R^1$—$X_3$ type, with X=COOH), 5-aminoisophthalic acid (noted AIPA, branching molecule of the Y—$R^4$—$X_2$ type, with Y=$NH_2$) and ε-caprolactam (noted CL, spacer of the X—$R^2$—Y type). The respective overall molar composition is 1/25/25 in BTC/AIPA/CL.

The reaction is carried out at atmospheric pressure in a 7.5 liter autoclave, commonly used for synthesis in the molten phase of polyamides.

The monomers are completely loaded at the beginning of the trial into the reactor preheated to 70° C. There are successively introduced into the reactor 1811.5 g of 5-aminoisophthalic acid (10 mol), 84 g of 1,3,5-benzenetricarboxylic acid (0.4 mol), 1131.6 g of ε-caprolactam (10 mol) and 1.35 g of a 50% (w/w) aqueous solution of hypophosphorous acid. The reactor is purged with dry nitrogen. The stirring is then set at 50 rpm and the reaction mass is heated from 70 to 260° C., in about 200 min.

About 220 g of distillate are recovered.

The nonfunctionalized hyperbranched copolyamide obtained is called HBPA/COOH. This branched polyamide has a content of terminal amine groups of 0 meq/kg and a content of terminal acid groups of 3934 meq/kg.

EXAMPLE 6

Preparation of Compositions Based on Polyamide 6+Nonfunctionalized HBPA of Example 5

Compositions are prepared from polyamide PA 6, glass fibers and a hyperbranched copolyamide of Example 5, at various levels of incorporation.

These compositions are prepared by adding nonfunctionalized HBPA of Example 5 in a polyamide 6 matrix in the molten state and 50% by weight of glass fibers, in a twin-screw extruder, WERNER ZSK 40 model (screw diameter 40 mm-L/D ratio: 3.2), under the following conditions: throughput: 40 kg/h; screw speed: 260 rpm, temperature profile (° C.) 220-250° C. A control composition is also prepared without addition of nonfunctionalized HBPA.

EXAMPLE 7

Preparation of Compositions Based on Polyamide 66+Alkyl Functionalized HBPA of Example 1

Compositions are prepared from polyamide PA 66, glass fibers and a hyperbranched copolyamide of Example 1 (corresponding to the additive (ii)), at various levels of incorporation.

These compositions are prepared by adding functionalized HBPA of Example 1 in a polyamide 66 matrix in the molten state and 50% by weight of glass fibers, in a twin-screw extruder, WERNER ZSK 40 model (screw diameter 40 mm-L/D ratio: 3.2), under the following conditions: throughput 40 kg/h; screw speed: 260 rpm, temperature profile (° C.) 250-280° C. The compositions and their properties are presented in the table below. A control composition is also prepared without adding functionalized HBPA.

EXAMPLE 8

Comparison of the Molar Mass of the Additivated Polyamide Matrices

The molar mass of the polyamide matrices of the compositions of Examples 6 and 7 are measured according to the protocol P defined above. The measurement of molar mass itself is carried out on the granules by gel permeation chromatography (GPC) in dichloromethane after derivatization of the polyamide with trifluoroacetic anhydride, relative to polystyrene standards. The detection technique used is refractometry (model RI ERMA refractometer, sensitivity 16). The GPC columns have the following characteristics: 3 mixed-C columns 5 μm, diameter ⅜, length 60 cm+precolumn 5 μm.

The compositions and the results are given in the table below:

TABLE 4

| Composition of the granules | Mass of the polyamide (g/mol) according to the protocol P | % variation of the mass relative to the control |
|---|---|---|
| CONTROL (PA66) | 73 770 | / |
| PA66 + 2% HBPA of Example 1 | 75 020 | +1.7 |
| PA66 + 5% HBPA of Example 1 | 75 650 | +2.4 |
| CONTROL (PA6) | 75 000 | / |
| PA6 + 2% HBPA/COOH | 70 000 | −6.6 |

TABLE 4-continued

| Composition of the granules | Mass of the polyamide (g/mol) according to the protocol P | % variation of the mass relative to the control |
|---|---|---|
| PA6 + 5% HBPA/COOH | 60 000 | −20 |
| PA6 + 10% HBPA/COOH | 57 000 | −24 |

The compositions comprise 50% by weight of glass fibers 5 relative to the total weight of the composition. The percentages are expressed by weight relative to the total weight of the composition.

The invention claimed is:

1. A thermoplastic composition comprising a mixture of a polyamide matrix with at least:
   (i) a first additive selected from the group consisting of isophthalic acid, terephthalic acid, adipic acid, trimesic acid, 2,2,6,6-tetrakis (β-carboxyethyl)cyclohexanone, 3,5,3',5'-biphenyltetracarboxylic acid, 1,3,5,7-naphthalenetetracarboxylic acid, 3,5,3',5'-benzophenonetetracarboxylic acid, and 1,2,4,5-benzenetetracarboxylic acid; and
   (ii) a second additive (B) obtained by a reaction between at least:
   a) one monofunctional compound of formula (III):

$$R^3-Y \quad (III)$$

selected from the group consisting of n-hexadecylamine, n-octadecylamine, n-dodecylamine, and benzylamine;
   b) one branching compound of formula (IV):

$$Y-R^4-X_m \quad (IV)$$

selected from the group consisting of 5-aminoisophthalic acid, 3,5-diaminobenzoic acid, 3,4-diaminobenzoic acid, and mixtures thereof;
   c) optionally, one multifunctional compound of formula (I):

$$R^1-X_n \quad (I);$$

and
   d) one bifunctional monomer of formula (II) or a corresponding cyclic form $$X-R^2-Y \quad (II)$$

selected from ε-caprolactam, the corresponding amino acid and mixtures thereof;
   in which:
   $R^1$, $R^2$, $R^3$ and/or $R^4$ represent, independently of each other, a hydrocarbon radical optionally comprising one or more heteroatoms;
   X and Y are antagonist reactive functional groups capable of reacting with each other to form an amide bond;
   n is an integer ranging from 3 to 50;
   m is an integer ranging from 2 to 10;
   and with the proviso that R, $R^1$, $R^2$, $R^3$ and $R^4$ do not comprise an amine, acid or alcohol functional group capable of forming an amide and/or ester bond, and
   (iii) reinforcing glass fibers,
   said composition having smooth impact resistance and/or notched impact resistance greater than compositions having the same composition except for the second additive B.

2. The thermoplastic composition as defined by claim 1, comprising from 0.01 to 5% by weight of the first additive (i) relative to the total weight of the composition.

3. The thermoplastic composition as defined by claim 1, comprising from 0.01 to 20% by weight of the second additive (ii) relative to the total weight of the composition.

4. The thermoplastic composition as defined by claim 1, wherein the first additive (i) is selected from the group consisting of isophthalic acid, trimesic acid, and 2,2,6,6-tetrakis (β-carboxyethyl)cyclohexanone, and/or a mixture thereof.

5. The thermoplastic composition as defined by claim 1, wherein the multifunctional compound of formula (I) is selected from the group consisting of 2,2,6,6-tetrakis(β-carboxyethyl)cyclohexanone, diaminopropane-N,N,N',N'-tetraacetic acid, nitrilotrialkylamines, trialkylenetetraamines and tetraalkylenepentaamines, 4-aminoethyl-1,8-octanediamine, 3,5,3',5'-biphenyltetracarboxylic acid, the acid derivatives of phthalocyanine and naphthalocyanine, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridine tetracarboxylic acid, trimesic acid, 1,2,4,5-benzenetetracarboxylic acid, 1,3,5-triazines, 1,4-diazines, melamine, the compounds derived from 2,3,5,6-tetraethylpiperazine, 1,4-piperazines, tetrathiafulvalenes, 2,4,6-tri(aminocaproic acid)-1,3,5-triazine, polyalkylene oxides containing at least three acid or amine functional groups, and/or mixtures thereof.

6. The thermoplastic composition as defined by claim 1, wherein the monofunctional compound of general formula (III) is n-hexadecylamine.

7. The thermoplastic composition as defined by claim 1, wherein the branching compound of formula (IV) is 5 aminoisophthalic acid.

8. The thermoplastic composition as defined by claim 1, wherein the content of terminal acid and amine groups of the second additive (ii) ranges from 0 to 300 meq/kg.

9. The thermoplastic composition as defined by claim 1, comprising a polyamide matrix of a (co)polyamide selected from the group consisting of polyamide 6, polyamide 6,6, polyamide 4, polyamide 11, polyamide 12, polyamides 4-6, 6-10, 6-12, 6-36, 12-12, and copolymers and mixtures thereof.

10. A process for the preparation of a thermoplastic composition as defined by claim 1, comprising mixing at least the first additive (i) and the second additive (ii) with the polyamide matrix.

11. A process for the shaping of an article by forming a thermoplastic composition as defined by claim 1, comprising the molding thereof.

12. A shaped article formed from the thermoplastic composition as defined by claim 1.

* * * * *